(12) United States Patent  
Ueoka et al.

(10) Patent No.: US 7,685,310 B2
(45) Date of Patent: Mar. 23, 2010

(54) COMPUTER SYSTEM AND DYNAMIC PORT ALLOCATION METHOD

(75) Inventors: Atsushi Ueoka, Tokyo (JP); Kenta Shiga, Tokyo (JP); Toshio Otani, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 570 days.

(21) Appl. No.: 11/603,530

(22) Filed: Nov. 21, 2006

(65) Prior Publication Data

US 2008/0126525 A1 May 29, 2008

(30) Foreign Application Priority Data

Sep. 27, 2006 (JP) .............................. 2006-262524

(51) Int. Cl.
*G06F 15/173* (2006.01)
(52) U.S. Cl. ....................... 709/241; 709/238; 709/239; 709/240
(58) Field of Classification Search ................. 709/238, 709/239, 227, 229
See application file for complete search history.

(56) References Cited

U.S. PATENT DOCUMENTS

| | | | | |
|---|---|---|---|---|
| 6,029,168 A * | 2/2000 | Frey | .............................. | 707/10 |
| 6,950,848 B1 * | 9/2005 | Yousefi'zadeh | ............. | 709/203 |
| 7,159,071 B2 * | 1/2007 | Ikeuchi et al. | ............... | 711/112 |
| 7,290,050 B1 * | 10/2007 | Smith et al. | ................. | 709/224 |
| 7,383,331 B2 * | 6/2008 | Takahashi et al. | ........... | 709/224 |
| 2004/0205761 A1 * | 10/2004 | Partanen | ..................... | 718/105 |
| 2005/0210144 A1 * | 9/2005 | Kumagai et al. | ............ | 709/229 |
| 2006/0026346 A1 | 2/2006 | Kadoiri et al. | | |

FOREIGN PATENT DOCUMENTS

JP        2006-40026        2/2006

OTHER PUBLICATIONS

J. Satran and K Meth, et al., "Internet Small computer Systems Interface (iSCSI)," Network Working Group Request for Comments: 3720, IBM, Cisco Systems, & Hewlett-Packard Co., Apr. 2004.

* cited by examiner

*Primary Examiner*—Quang N. Nguyen
*Assistant Examiner*—Razu A Miah
(74) *Attorney, Agent, or Firm*—Sughrue Mion, PLLC

(57) ABSTRACT

Either a controller in a storage system, or a management computer monitors a bandwidth used in each I/O port in the storage system, and a bandwidth used by each host computer connected to each I/O port, and redirects a host computer using a bandwidth close to a difference in bandwidth used in the I/O ports, from the I/O port where a maximum bandwidth is used to the I/O port where a minimum bandwidth is used.

6 Claims, 16 Drawing Sheets

| I/O PORT | BANDWIDTH | USED BANDWIDTH | IP ADDRESS |
|---|---|---|---|
| PORT 1 | 1000 | 400 | 192.168.20.100 |
| PORT 2 | 1000 | 600 | 192.168.20.101 |
| ... | ... | ... | ... |
| PORT n | 1000 | 800 | 192.168.20.n |

| I/O PORT | SESSION | IP ADDRESS | USED BANDWIDTH |
|---|---|---|---|
| PORT 1 | S1 | 192.168.30.10 | 100 |
| PORT 1 | S2 | 192.168.30.11 | 200 |
| ... | ... | ... | ... |
| PORT 2 | Sn | 192.168.30.n | 150 |

| I/O PORT | BANDWIDTH | POST-REDIRECT-PROCESSING BANDWIDTH | IP ADDRESS |
|---|---|---|---|
| PORT 1 | 1000 | 400 | 192.168.20.100 |
| PORT 2 | 1000 | 600 | 192.168.20.101 |
| ... | ... | ... | ... |
| PORT n | 1000 | 800 | 192.168.20.n |

| REDIRECT PORT | SESSION | IP ADDRESS | USED BANDWIDTH | CURRENT PORT |
|---|---|---|---|---|
| PORT 2 | S1 | 192.168.30.10 | 100 | PORT 1 |
| PORT 1 | S2 | 192.168.30.11 | 200 | PORT 1 |
| ... | ... | ... | ... | ... |
| PORT 2 | Sn | 192.168.30.n | 150 | PORT 2 |

| 200 | 70

FIG.14

| STORAGE | IP ADDRESS | ACCEPTABLE PERFORMANCE DIFFERENCE | NUMBER OF I/O PORTS |
|---|---|---|---|
| Storage00 | 192.168.1.100 | 100 | 4 |
| Storage01 | 192.168.1.101 | 150 | 4 |
| .... | .... | .... | |

COMPUTER SYSTEM AND DYNAMIC PORT ALLOCATION METHOD

CROSS-REFERENCES TO RELATED APPLICATIONS

This application relates to and claims priority from Japanese Patent Application No. 2006-262524, filed on Sep. 27, 2006, the entire disclosure of which is incorporated herein by reference.

The present invention relates to a method and system for dynamic allocation of ports in a storage system to which host computers are connected.

Storage systems, as represented by disk array apparatuses, logically divide storage areas provided by the disk devices therein, and provide host computers with the divided areas as volumes. A storage area network (SAN) is widely used, in which storage systems and host computers are both connected to a network and the storage system volumes are provided to the host computers.

In a SAN, host computers access the storage system volumes by communicating a SCSI command encapsulated based on a network protocol. For example, in iSCSI, a SCSI command is encapsulated for an IP network. In iSCSI, an IP connection is established between an iSCSI initiator that handles a SCSI command in a host computer and an iSCSI target that operates in a storage system, and communication for the host computer to access the storage system is controlled on the IP connection. This IP connection is called an iSCSI session in iSCSI. An iSCSI session is established when an iSCSI initiator logs-in to an iSCSI target.

In a SAN like that described above, plural host computers access volumes by establishing iSCSI sessions via the same port in a storage system. So, if the volume access load applied by one host computer increases, that will cause a problem of considerably reduced volume access performance in the other host computers connected to the storage system via the same port.

iSCSI provides a method called "redirect," in which, when a host computer (iSCSI initiator) is going to log-in to a storage system (iSCSI target), the storage system informs the host computer of the identification information for a target port for connection, and the host computer is connected to that port. Applying the above redirect function, in a storage system having a plurality of ports, it is possible to balance the number of host computers connected to each port.

Also, Japanese Patent Laid-open Publication No. 2006-40026 discloses a method in which a host computer, which is connected to a plurality of ports in a storage system, monitors the communication status in each port, and can thereby access the storage system via a low-load port. With this method, it is possible to reduce the deterioration of access performance in the host computer accessing the storage system.

SUMMARY

In an environment where the number of host computers connected to a SAN in a large scale computer system is greatly increasing, if each host computer changes its connection path using the method disclosed in Japanese Patent Laid-open Publication No. 2006-40026, that may result in a situation where a large number of host computers simultaneously change their connection paths to be connected to the same port, and that situation causes a problem in that the load applied to the changed connection paths increases and it becomes necessary to change the connection paths again.

Also, although the method disclosed in Japanese Patent Laid-open Publication No. 2006-40026 enables balancing the number of host computers connected to each port in a storage system, how much load is applied by each host computer to the storage system cannot be known, causing a problem of load imbalance between each port.

Accordingly, in order to solve the above-described problems, it is an object of the present invention to balance the load in each port in a storage system and prevent the deterioration of access performance in the host computers connected to a port with an increased load.

In order to achieve the above object, a computer system according to a first aspect of the invention includes: a plurality of host computers; and at least one storage system that has a plurality of ports for connection to the plurality of host computers and provides volumes for the plurality of host computers via a storage network. The storage system monitors the difference in load between the plurality of ports; monitors the load applied to a connection path between the plurality of host computers and the storage system; identifies, when the difference in load between the plurality of ports reaches or exceeds a predetermined value, the host computers connected to the port with the highest load in the plurality of ports; disconnects at least one of the identified host computers from the storage system; and transmits, when the host computer that has been disconnected from the storage system sends a reconnection request, a command for redirection to the port with the lowest load in the plurality of ports, to the host computer that has sent the reconnection request.

With the above configuration, it is possible to monitor the load in a plurality of ports in a storage system, and redirect sessions from a high-load port to a low-load port, bringing about the advantageous effects of balancing the load in each port and preventing considerable deterioration of access performance in the host computers connected to a port with an increased load.

In the above configuration, the storage system calculates the average load between the port with the highest load and the port with the lowest load in the plurality of ports, calculates the load difference between the average load and the load in the port with the highest load or the port with the lowest load, and selects, from among the plurality of host computers, the host computer that applies the load closest to that load difference to the port.

The storage system calculates the difference in load between the plurality of ports when the identified host computer has been redirected to the port with the lowest load, and if the difference in load between the plurality of ports when the identified host computer has been redirected to the port with the lowest load reaches or exceeds a predetermined value, the storage system executes the processing for identifying the host computers connected to the port with the highest load.

A computer system according to a second aspect of the invention includes: a plurality of host computers; at least one storage system that has a plurality of ports for connection to the plurality of host computers and provides volumes for the plurality of host computers via a storage network; and a management computer connected respectively to the plurality of host computers and the storage system via a management network. The management computer monitors the difference in load between the plurality of ports; monitors the load applied to the plurality of ports by the host computers connected thereto; identifies, when the difference in load between the plurality of ports reaches or exceeds a predetermined value, the host computers connected to the port with the highest load in the plurality of ports; and transmits a command for reconnection to the port with the lowest load in the plurality of ports, to at least one of the identified host computers. The host computer establishes connection to the port specified in the reconnection command from the management computer.

With the above configuration, it is possible to monitor the load in a plurality of ports in a storage system, and redirect sessions from a high-load port to a low-load port, bringing about the advantageous effects of balancing the load in each port and preventing considerable deterioration of access performance in the host computers connected to a port with an increased load.

The management computer calculates the average load between the port with the highest load and the port with the lowest load in the plurality of ports, calculates the load difference between the average load and the load in the port with the highest load or the port with the lowest load, and selects, from among the plurality of host computers, the host computer that applies the load closest to that load difference to the port.

The management computer calculates the difference in load between the plurality of ports when the identified host computer has been redirected to the port with the lowest load, and if the load difference between the plurality of ports when the identified host computer has been redirected to the port with the lowest load reaches or exceeds a predetermined value, the management computer again executes the processing for identifying the host computers connected to the highest load.

After the host computer has established connection to the port in the storage system specified in the reconnection command sent from the management computer, the host computer disconnects connection between the host computer and the port that the host computer had used up to then, when access to that previously-used port is completed.

According to the present invention, it is possible to monitor the load in a plurality of ports in a storage system, and redirect sessions from a high-load port to a low-load port, bringing about the advantageous effects of balancing the load in each port and preventing considerable deterioration of access performance in the host computers connected to a port with an increased load.

Also, since a storage system port to which a host computer is connected is automatically allocated, and there is no need for design and settings for allocating ports in a storage system connected to a host computer, an advantageous effect is also achieved in that the administrator's workload can be reduced.

Other aspects and advantages of the invention will be apparent from the following description and the appended claims.

BRIEF DESCRIPTION OF THE DRAWINGS

FIG. 4 is a diagram explaining the configuration of a session performance information table.

FIG. 5 is a diagram explaining the configuration of a redirect port table.

FIG. 6 is a diagram explaining the configuration of a redirect session table.

FIG. 7 is a diagram explaining the registration content of a redirect threshold.

FIG. 14 is a diagram explaining the configuration of a storage management table.

DETAILED DESCRIPTION OF PREFERRED EMBODIMENTS

Embodiment 1

Figure 1:
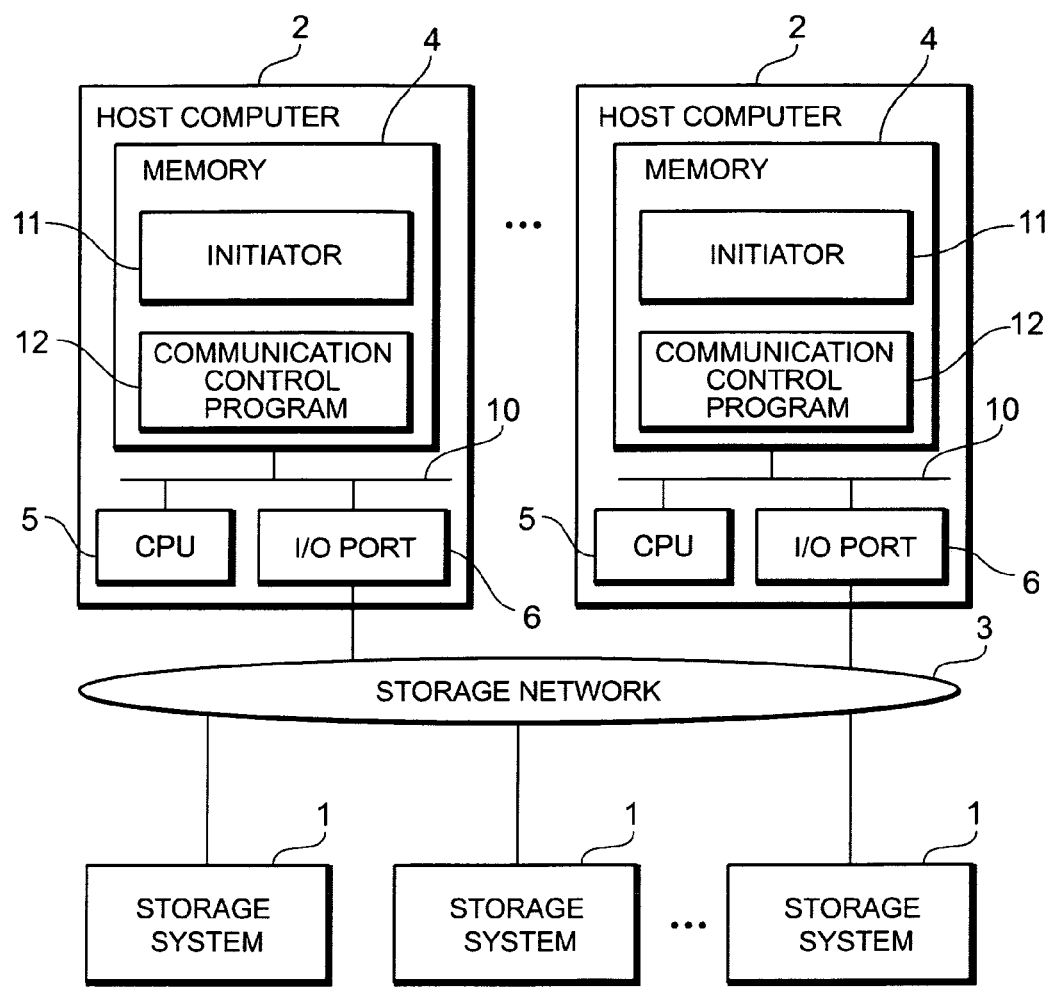
FIG. 1 is a diagram showing the configuration of a computer system according to embodiment 1 of the present invention.

FIG. 1 shows the configuration of a computer system according to embodiment 1 of the present invention. A computer system according to this embodiment includes a plurality of host computers 2 and at least one storage system 1 connected to the host computers 2 via a storage network 3. The storage system 1 may be a separate device as shown in FIG. 1, or may be a virtual storage system defined by logically dividing one storage system.

The host computers 2 access volumes provided by the storage system 1 via the storage network 3. The host computers 2 each have memory 4, a CPU 5, an I/O port 6 for connection to the storage network 3, and a bus 10 for connecting the memory 4, CPU 5 and I/O port 6. The memory 4 stores a communication control program 12 for establishing communication via a communication protocol used in the storage network 3, and an initiator 11 for controlling access to the storage system 1, and also stores an operating system (not shown in the drawing), and application programs (not showing in the drawing) for accessing data stored in the storage system 1. The CPU 5 executes those programs and accesses volumes provided by the storage system 1.

Figures 2, 3:
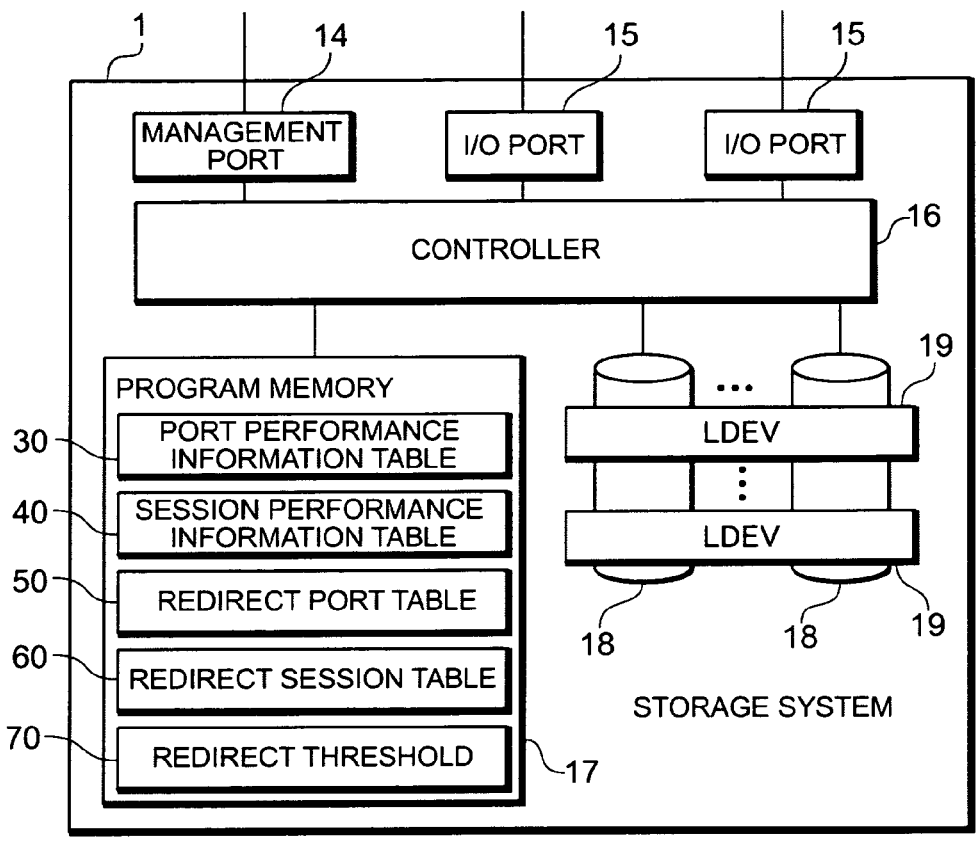
FIG. 2 is a diagram showing the configuration of a storage system according to embodiment 1 of the present invention.
FIG. 3 is a diagram explaining the configuration of a port performance information table.

FIG. 2 shows the configuration of the storage system 1 according to this embodiment. The storage system 1 includes: a management port 14 for managing the storage network 3; at least two I/O ports 15 for connection to the storage network 3; a controller 16 for executing control in the storage system 1; program memory 17 for use by the controller 16; and at least one disk device 18 that provides at least one volume 19.

The program memory 17 stores: a port performance information table 30 for keeping information concerning the performance of each I/O port 15 in the storage system 1; a session performance information table 40 for keeping information concerning the performance of each logical session created between the storage system 1 and the host computers 2 connected to each I/O port 15; a redirect port table 50 used when selecting a port to which a session is to be redirected; a redirect session table 60 used when selecting a session to be redirected; and a redirect threshold 70 showing a threshold concerning the performance difference between the plural I/O ports 15, which is a condition for starting to redirect a session.

Note that the disk device 18 may be various types of disk drive, such as an FC (Fibre Channel) disk drive, SATA (Serial Advanced Technology Attachment) disk drive, PATA (Parallel Advanced Technology Attachment) disk drive, FATA (Fibre Attached Technology Adapted) disk drive, SCSI (Small Computer System Interface) disk drive, etc., and that flash memory or similar may also be used instead of the disk device 18, as a storage device for providing a volume 19.

FIG. 3 shows the configuration of the port performance information table 30. The port performance information table 30 has: a field 31 for registering identification information for an I/O port 15 in the storage system 1 used to access a volume 19; a field 32 for registering the bandwidth in the relevant I/O port 15; a field 33 for registering the bandwidth used in the relevant I/O port 15; and a field 34 for registering the IP address established for the relevant I/O port 15.

For example, when referring to the information about the I/O port 15 identified by the "port 1" identification information, the information indicates that the above I/O port 15 can handle a bandwidth of up to "1000," of which a bandwidth of "400" is actually used, and is assigned an IP address of "192.168.20.100." The controller 16 in the storage system 1 monitors the bandwidth used in each I/O port, and keeps the port performance information table 30 constantly updated.

FIG. 4 shows the configuration of the session performance information table 40. The session performance information table 40 has: a field 41 for registering identification information for an I/O port 15 in the storage system 1 used to access a volume 19; a field 42 for registering identification information concerning a logical session established between the storage system 1 and a host computer 2 connected thereto via the relevant I/O port 15; a field 43 for registering the IP address assigned to the I/O port 6 in the host computer 2 connected to the storage system 1 using the session identified by the identification information registered in field 42; and a field 44 for registering, of the bandwidth used in the I/O port 15 identified by the identification information registered in field 41, the bandwidth used by the session identified by the identification information registered in field 42.

For example, FIG. 4 shows that the I/O port 15 identified by the "port 1" identification information is connected to two sessions identified by the "S1" and "S2" identification information, and it also shows that the session identified by the "S1" identification information is used by the host computer 2 having the I/O port 6 assigned an IP address of "192.168.30.10," and that this session uses a bandwidth of "100," of the bandwidth in the I/O port 15.

FIG. 5 shows the configuration of the redirect port table 50. The redirect port table 50 has: a field 51 for registering identification information for an I/O port 15 in the storage system 1; a field 52 for registering the bandwidth up to which the relevant I/O port 15 can handle; a field 53 for registering the bandwidth used in the relevant I/O port 15 after redirect processing is executed; and a field 54 for registering the IP address assigned to the relevant I/O port 15.

For example, FIG. 5 shows that the I/O port 15 identified by the "port 1" identification information can handle a bandwidth of up to "1000," a bandwidth of "400" is used in the I/O port 15 after redirect processing is executed, and the I/O port 15 is assigned an IP address of "192.168.20.100."

FIG. 6 shows the configuration of the redirect session table 60. The redirect session table 60 has: a field 61 for registering identification information for an I/O port 15 to which a session is to be redirected; a field 62 for registering identification information concerning a session to be redirected; a field 63 for registering the IP address assigned to the I/O port 6 in the host computer 2 connected to the storage system 1 using the session identified by the identification information registered in field 62; a field 64 for registering the bandwidth used by the session identified by the identification information recorded in field 62; and a field 65 for registering identification information concerning the I/O port 15 to which the session identified by the identification information recorded in field 62 is currently connected.

For example, FIG. 6 shows that the session identified by the "S1" identification information is currently connected to the I/O port 15 identified by the "port 1" identification information, the session is used by the host computer 2 having the I/O port 6 assigned an IP address of "192.168.30.10," the session uses a bandwidth of "100," of the bandwidth in the I/O port 15, and the session is to be redirected to another I/O port 15 identified by the "port 2" identification information.

FIG. 7 shows an example of the content registered in the redirect threshold 70. The controller 16 in the storage system 1 executes session redirect processing if the performance difference between the I/O ports 15 exceeds the redirect threshold 70.

Referring next to FIGS. 8-11, the steps in the dynamic port allocation method according to this embodiment executed by the controller 16 in the storage system 1 will be explained.

Figure 8:
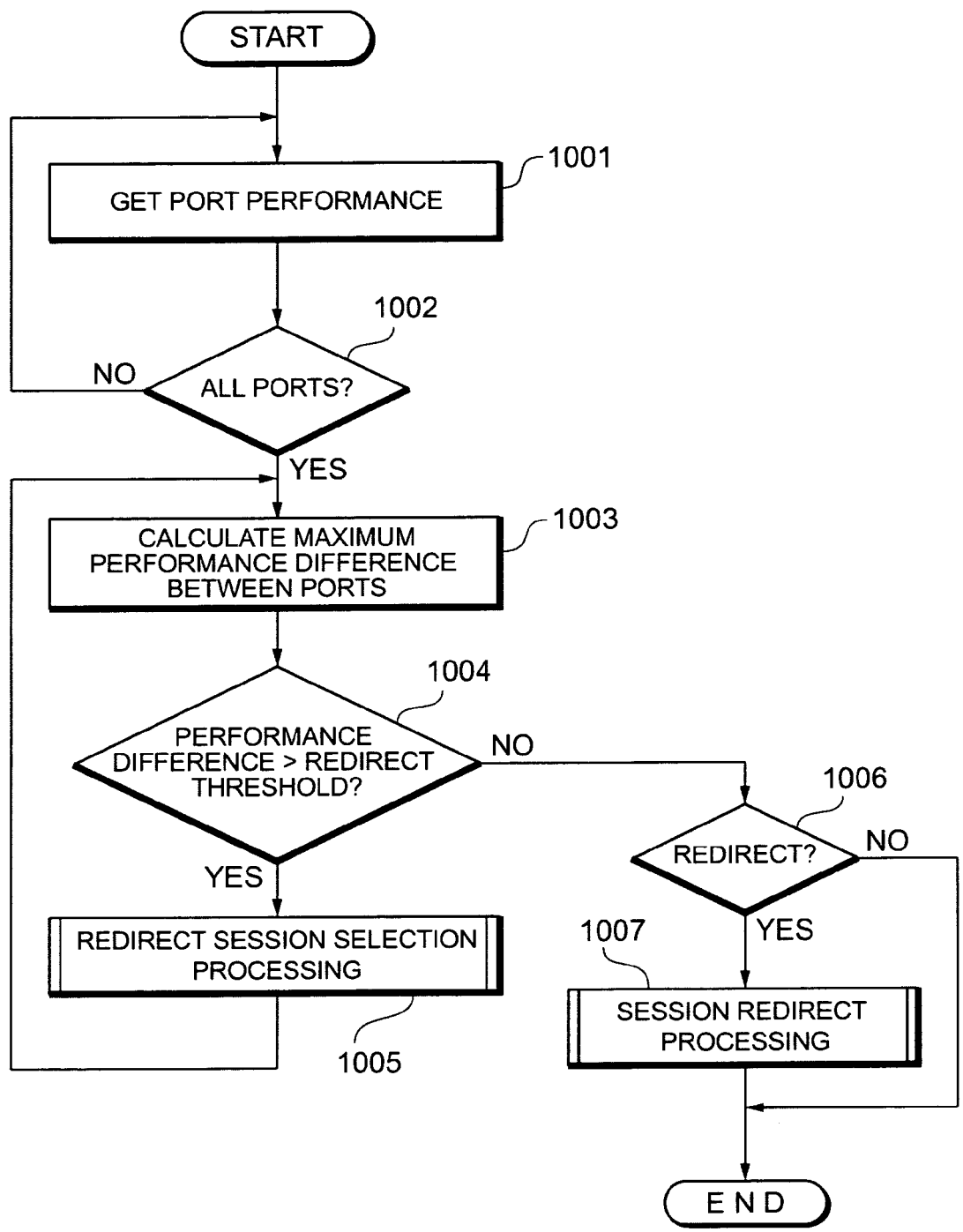
FIG. 8 is a flowchart showing flow of processing in which a session is redirected.

FIG. 8 shows flow of processing in which the controller 16 in the storage system 1 executes the steps in the dynamic port allocation method.

The controller 16 obtains one entry from the port performance information table 30, and registers it in the redirect port table 50 (step 1001). More specifically, the information in field 31 is registered in field 51, the information in field 32 is registered in field 52, the information in field 33 is registered in field 53, and the information in field 34 is registered in field 54.

Then, the controller 16 checks whether information has been obtained for all entries in the port performance information table 30 (step 1002). If information has been obtained for all entries (step 1002; YES), the controller 16 moves to step 1003, and if not (step 1002; NO), the controller 16 again executes step 1001 and obtains the next entry in the port performance information table 30.

The controller 16 refers to field 53 for all entries in the redirect port table 50, and calculates the difference between the maximum value and the minimum value of the post-redirect-processing bandwidth (step 1003). In the example shown in FIG. 5, the maximum value of the post-redirect-processing bandwidth is a bandwidth of "800" used in the port n, and the minimum value of the post-redirect-processing bandwidth is a bandwidth of "400" used in the port 1, so the difference is "400."

Then, the controller 16 checks whether the maximum difference in bandwidth used in each port calculated in step 1003 is larger than the redirect threshold 70 or not (step 1004), and if it is larger (step 1004; YES), the controller 16 moves to step 1005, and if it is smaller (step 1004; NO), the controller 16 moves to step 1006.

In step 1005, the controller 16 selects a session to be redirected, and again calculates the maximum difference in bandwidth used in each port after that session is redirected (step 1003). Then, the controller 16 again executes step 1004. The details of the processing in step 1005 will be explained later.

On the other hand, in step 1006, by checking whether any entry exists in the redirect session table 60, the controller 16 judges whether there is a session to be redirected or not. If there is no session to be redirected (step 1006; NO), the controller 16 ends the processing. If there are session(s) to be redirected (step 1006; YES), the controller 16 redirects the session(s) (step 1007) and ends the processing. The details of the processing in step 1007 will be explained later.

Figure 9:
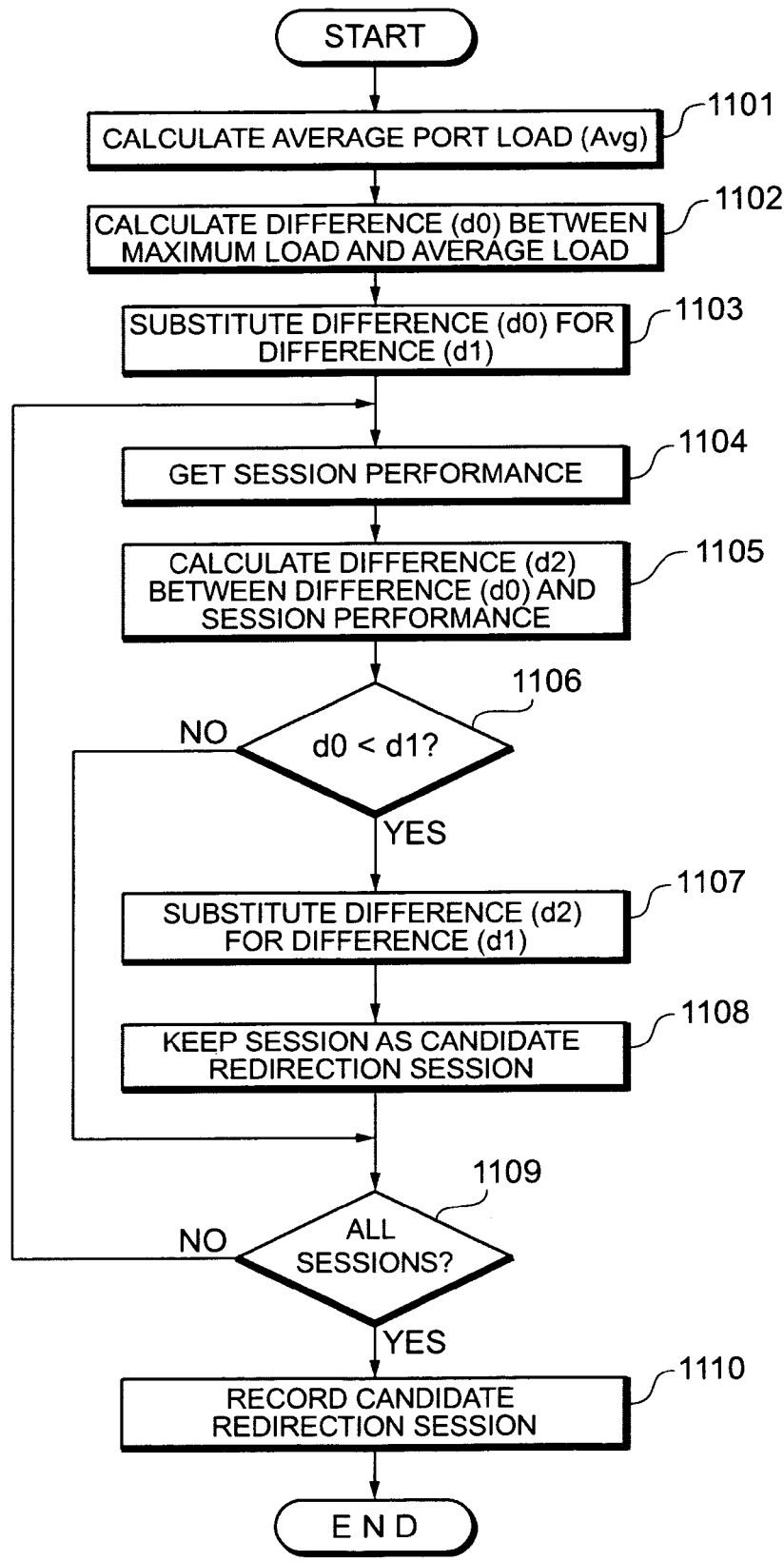
FIG. 9 is a flowchart showing flow of processing in which a session to be redirected is specified.

Next, the processing for selecting a session to be redirected (step 1005 in FIG. 8) will be explained with reference to FIG. 9.

The controller 16 refers to the redirect port table 50, and calculates the average bandwidth (Avg) between the maximum bandwidth and the minimum bandwidth used in the I/O ports 15 (step 1101). For example, in the example shown in FIG. 5, a bandwidth of "800" is used in the port n and a bandwidth of "400" is used in the port 1, so the average bandwidth (Avg) between the two is "600."

Then, the controller 16 substitutes the difference between the average bandwidth (Avg) and the maximum bandwidth used in the I/O port 15 for difference (d0) (step 1102). In the example shown in FIG. 5, the difference between the "800" bandwidth used in the port n and the "600" average bandwidth, i.e., "200" is substituted for the difference (do). The controller 16 substitutes the difference (d0) calculated in step 1102 for difference (d1) (step 1103).

Next, the controller 16 obtains, from the session performance information table 40, one entry concerning a particular session connected to the I/O port 15 where the maximum bandwidth is used (step 1104), and calculates difference (d2) between the difference (d0) and the value in field 44 of the entry obtained in step 1104 (step 1105).

Then, the controller 16 compares the difference (d1) with the difference (d2) (step 1106), and if the difference (d1) is smaller than the difference (d2) (step 1106; NO), the controller 16 moves to step 1109, and if the difference (d2) is smaller than the difference (d1) (step 1106; YES), the controller 16 moves to step 1107.

In step 1107, the controller 16 substitutes the difference (d1) for the difference (d2), and keeps the session obtained in step 1105 as a candidate redirection session (step 1108).

Then the controller 16 checks whether the processes from step 1104 to step 1108 have been executed for all sessions connected to the I/O port 15 where the maximum bandwidth is used (step 1109), and if the processes have been executed for all sessions (step 1109; YES), the controller 16 moves to step 1110, and if the processes have not been executed for some of the sessions (step 1109; NO), the controller 16 moves to step 1104.

The controller 16 records, in the redirect session table 60, the content of the entry in the session performance information table 40 concerning the session corresponding to that selected in step 1108 as a candidate redirection session (step 1110). More specifically, the information in field 41 is registered in field 65, the information in field 42 is registered in field 62, the information in field 43 is registered in field 63, and the information in field 44 is registered in field 64. Also, the identification information for the I/O port 15 where the minimum bandwidth is used is registered in field 61.

As a result of the foregoing steps, the processing for selecting a session to be redirected is completed.

Figure 10:
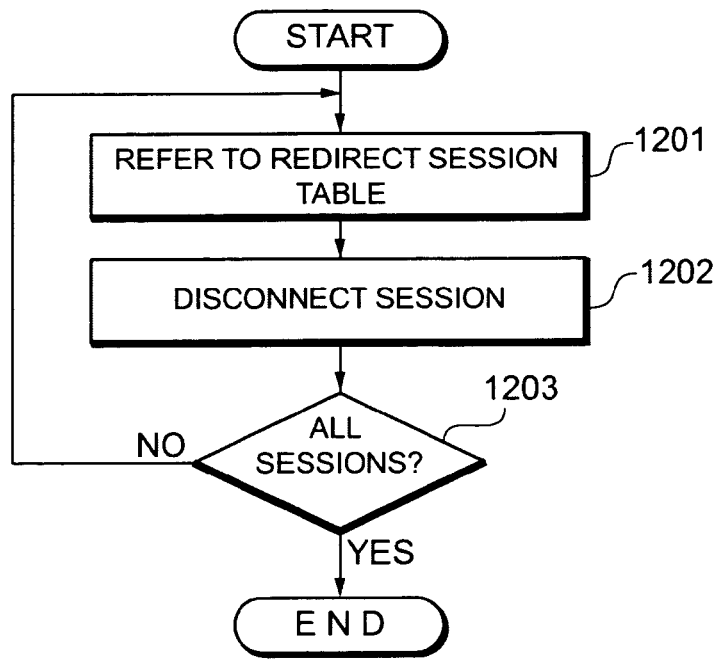
FIG. 10 is a flowchart showing flow of processing in which a session to be redirected is disconnected.
Figure 11:
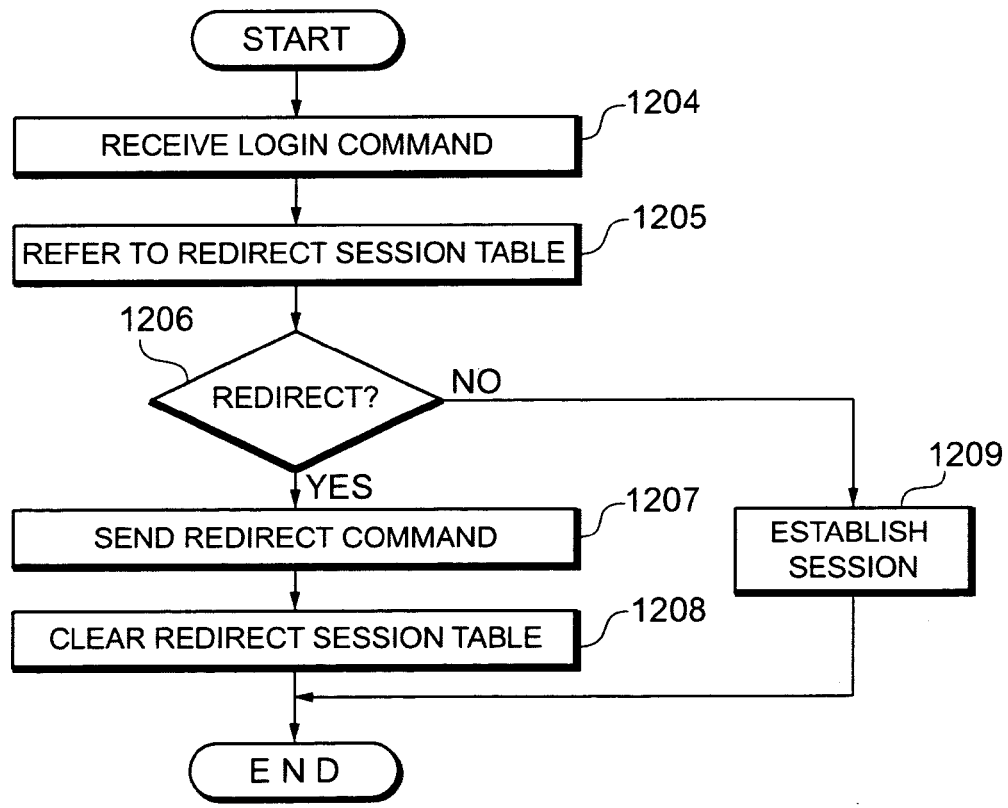
FIG. 11 is a flowchart showing flow of processing in which a host computer requesting reconnection is informed of an I/O port address as a redirection destination.

Referring next to FIGS. 10 and 11, the details of the processing for redirecting session(s) (step 1107 in FIG. 8) will be explained.

FIG. 10 shows flow of processing in which session(s) to be redirected are disconnected.

The controller 16 obtains one entry from the redirect session table 60 (step 1201), and disconnects the session indicated by that entry (step 1202).

Next, the controller 16 checks if the corresponding sessions have been disconnected for all entries in the redirect session table 60 (step 1203). If all corresponding sessions have been disconnected (step 1203; YES), the controller 16 ends the processing, and if some sessions have not yet been disconnected (step 1203; NO), the controller 16 goes back to step 1201.

FIG. 11 shows flow of processing in which, upon receipt of a re-connection request from a host computer 2 whose session has been disconnected, a command for redirection is transmitted to that host computer 2.

The controller 16 receives a login command from the host computer 2 (step 1204).

Then, the controller 16 searches the redirect session table for an entry having the IP address for the I/O port 6 in the host computer 2 contained in the login command, and also having the identification information for the I/O port assigned the IP address for an I/O port 15 in the storage system 1 that the host computer 2 is going to log-in to (step 1205).

The controller 16 then checks whether an applicable entry has been obtained in step 1205 or not, i.e., whether the host computer 2 that has sent the login command is one to be redirected or not (step 1206). If the host computer 2 is one to be redirected in step 1206 (step 1206; YES), the controller 16 moves to step 1207, and if the host computer 2 does not need to be redirected (step 1206; NO), the controller 16 establishes a session based on iSCSI specifications (step 1209), and ends the processing.

In step 1207, the controller 16 sends an iSCSI-based redirect command to the host computer 2 that has sent the login command. Then the controller 16 deletes the entry obtained in step 1205 from the redirect session table 60 (step 1208), and ends the processing.

Note that the above login command, redirect command, and process of disconnection of a session are based on the specifications in the "RFC-3347 Small Computer Systems Interface protocol over the Internet (iSCSI) Requirements and Design Considerations," IETF 2002.

As explained above, according to embodiment 1 of the present invention, the controller 16 in the storage system 1 monitors how much bandwidth is used in each I/O port 15 in the storage system 1, and redirects a host computer 2 connected to a port where a larger bandwidth is used to a port where a smaller bandwidth is used. As a result, an advantageous effect is achieved in that the bandwidth used in each of a plurality of I/O ports 15 in the storage system 1 can be well balanced.

Also, if one host computer 2 uses a considerably large amount of the bandwidth in an I/O port, it is possible to prevent considerable deterioration of performance in other host computers 2 connected to the same I/O port 15 when they access a volume 19 provided by the storage system 1.

Also, since an I/O port 15 in the storage system 1 to which the host computers 2 are connected is automatically selected in accordance with the load in each port, and there is no need for design and settings for allocating an I/O port in the storage system 1, to which the host computers 2 are connected, another advantageous effect is also achieved in that the administrator's workload can be reduced.

Embodiment 2

Figure 12:
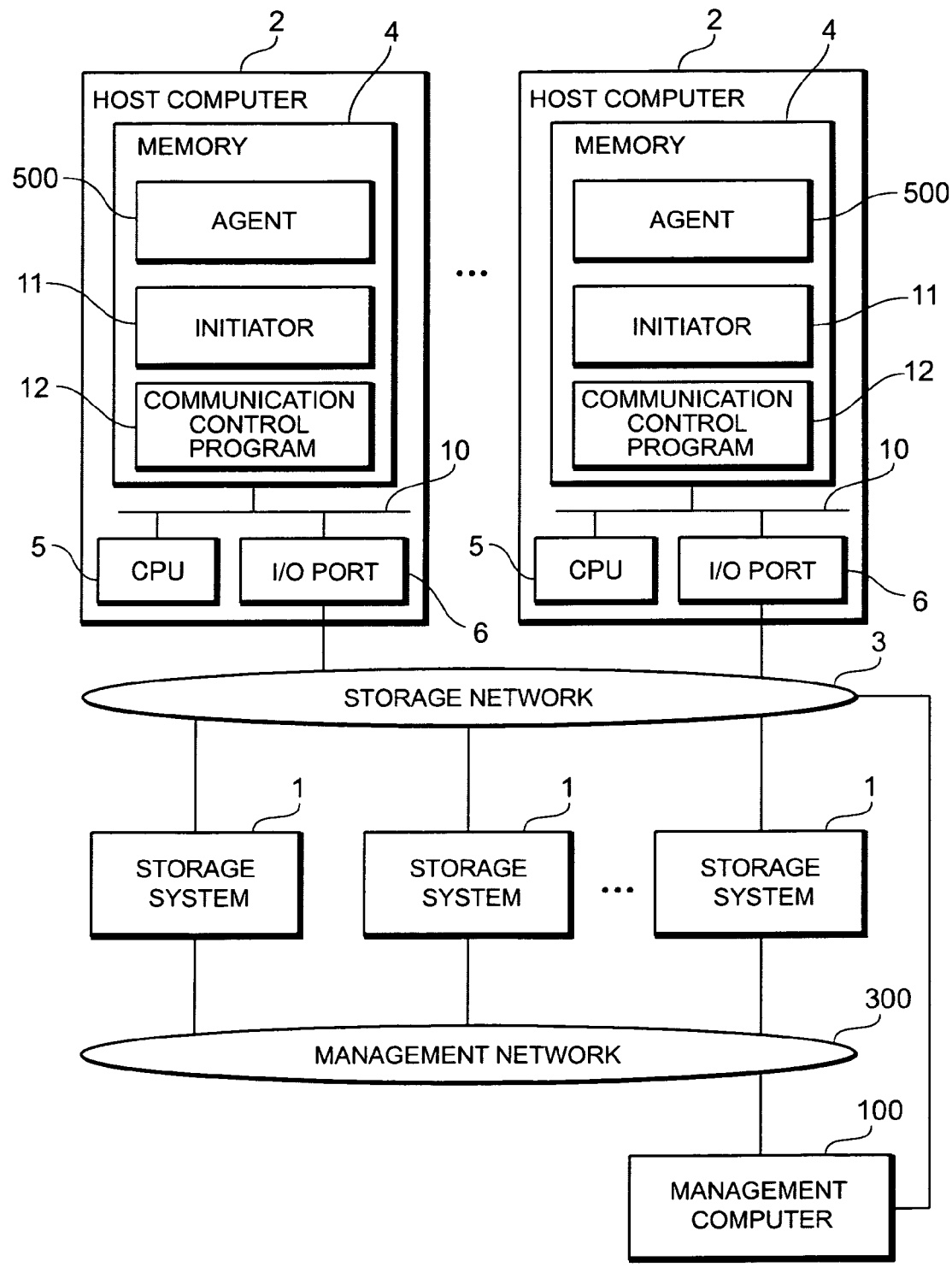
FIG. 12 is a diagram showing the configuration of a computer system according to embodiment 2 of the present invention.

FIG. 12 shows the configuration of a computer system according to embodiment 2 of the present invention. The same reference numerals as those used in FIG. 1 indicate the same devices. The below description will be made concerning the major differences between embodiment 1 and embodiment 2.

A management computer 100 is connected to storage system(s) 1 via a management network 300, and is also connected to host computers 2 via a storage network 3. Also, an agent program 500 runs in memory 4 in the host computer 2. The details of the agent program 500 will be explained later. Each storage system 1 is connected to the management network 300 via a management port, not shown in the drawing.

In the above configuration, the storage network 3 and the management network 300 may also be one network, but in this embodiment, the two networks are separate networks for convenience. In addition, although the storage system 1 according to this embodiment has almost the same configuration as that of the storage system 1 according to embodiment 1, the program memory in the storage system 1 according to this embodiment is different from embodiment 1, in that it stores a port performance information table 30 and a session performance information table 40 only, and doesn't store a redirect port table 50, a redirect session table 60, and a redirect threshold 70.

Figure 13:
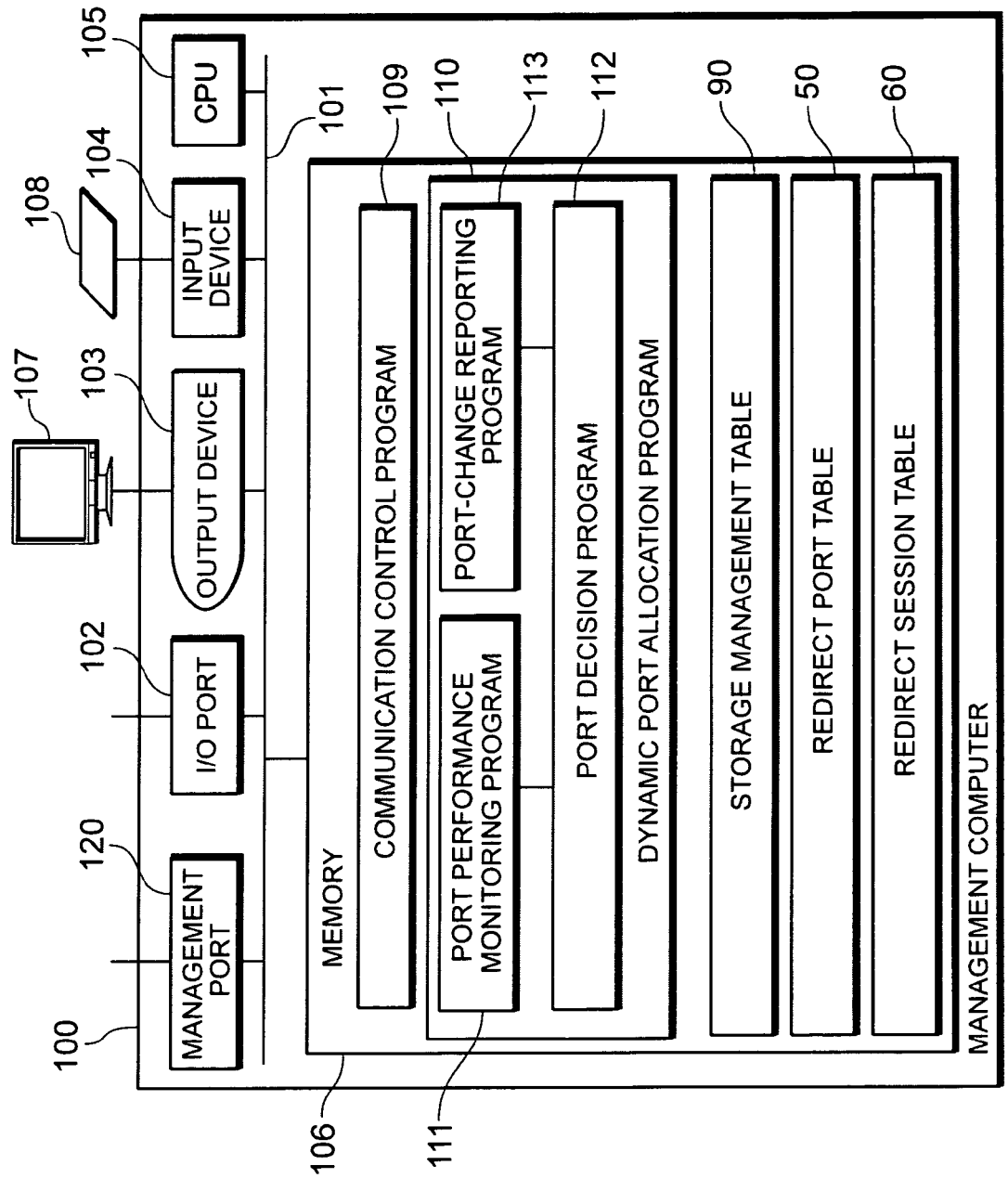
FIG. 13 is a diagram showing the system configuration of a management computer.

FIG. 13 shows the configuration of the management computer 100. The management computer 100 includes: an I/O port 102 for connection to the storage network 3; an output device 103 for outputting various information to a display device 107; an input device 104 for processing information input from a keyboard 108; a CPU 105; memory 106 used as a work area for the CPU 105; a management port 120 for connection to the management network 300; and a bus 101 for interconnecting the I/O port 102, output device 103, input device 104, CPU 105, memory 106, and management port 120.

The memory 106 stores: an operating system (not shown in the drawing); a communication control program 109 for controlling a communication protocol used in the management network 300 or in the storage network 3; a dynamic port allocation program 110 that executes each step of a dynamic port allocation method according to this embodiment; a storage management table 90; a redirect port table 50; and a redirect session table 60.

The formats and intended use of the redirect port table 50 and the redirect session table 60 are the same as those in embodiment 1.

The dynamic port allocation program 110 is composed of: a port performance monitoring program 111 for monitoring the performance of an I/O port 15 in the storage system 1; port decision program 112 for selecting a session to be redirected and an I/O port 15 to which the session is to be redirected; and a port-change reporting program 113 for informing the agent program 500 running in the host computer 2 of the change of the I/O port 15 to be connected.

FIG. 14 shows the configuration of the storage management table 90. The storage management table 90 has: a field 91 for registering identification information for a storage system 1; a field 92 for registering the IP address assigned to the management port 14 in the storage system 1 identified by the identification information in field 91; a field 93 for registering a threshold for the difference in bandwidth used in each I/O port 15, based on which redirection of session(s) is started in the storage system 1 identified by the identification information in field 91; and a field 94 for registering the number of I/O ports 15 that the storage system 1 identified by the identification information in field 91 has.

For example, FIG. 14 shows that the storage system 1 identified by "Storage00" has a management port 14 assigned an IP address of "192.168.1.100," starts redirection of session(s) if the difference in bandwidth used in each I/O port 15 becomes "100," and has four I/O ports 15.

Referring next to FIGS. 15-22, steps of a dynamic port allocation method according to this embodiment, which is executed by the dynamic port allocation program 110 running in the management computer 100, will be explained.

Figure 15:
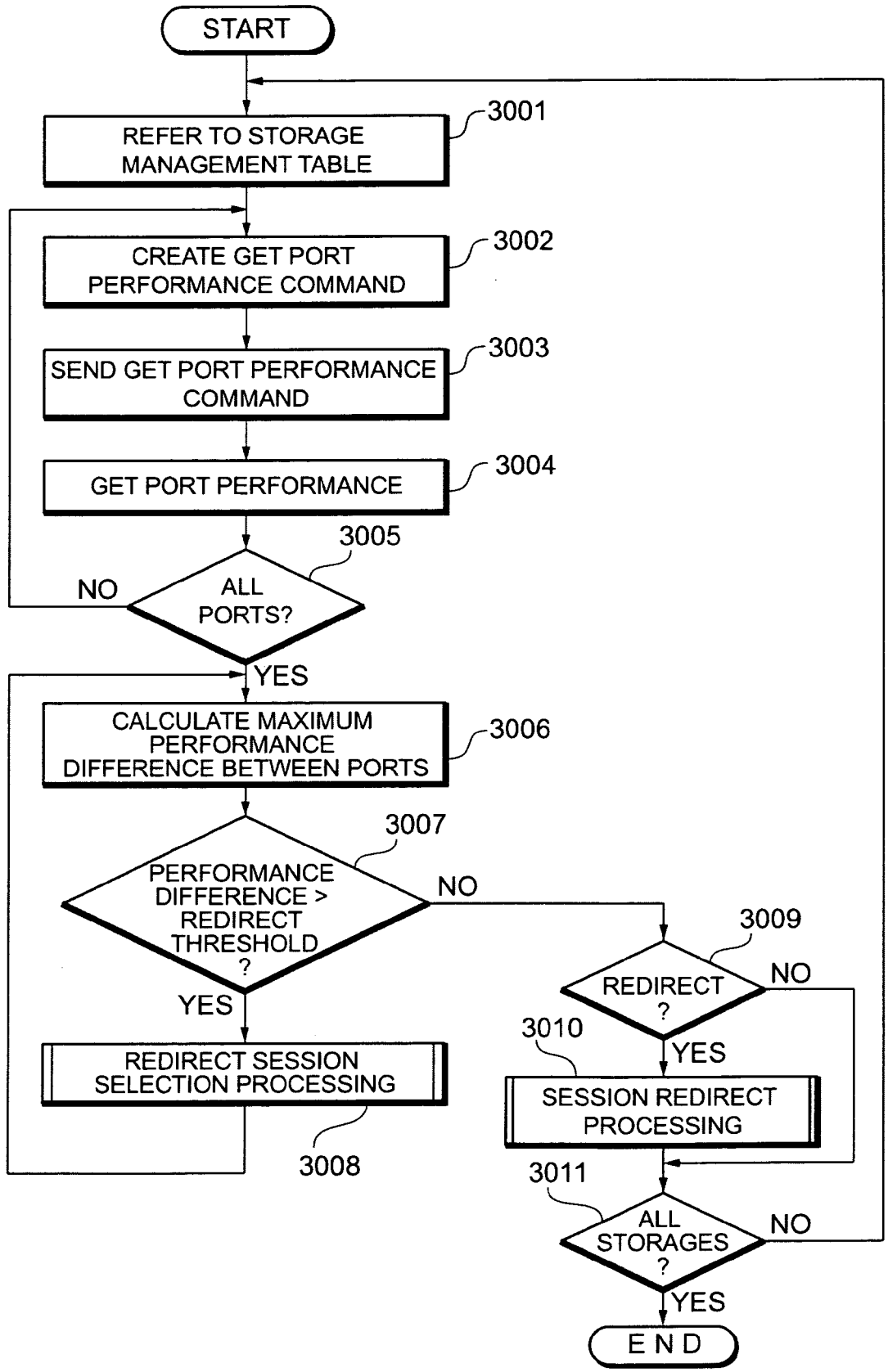
FIG. 15 is a flowchart showing flow of processing in which a dynamic port allocation program specifies a session to be redirected and redirects the session.

FIG. 15 shows flow of processing in which the dynamic port allocation program 110 specifies a session to be redirected and executes redirection of the session.

The dynamic port allocation program 110 refers to one entry in the storage management table 90 (step 3001), and creates a get port performance command 200 to send it to the storage system 1 corresponding to the storage system in the entry referred to above (step 3002).

Figure 20A:
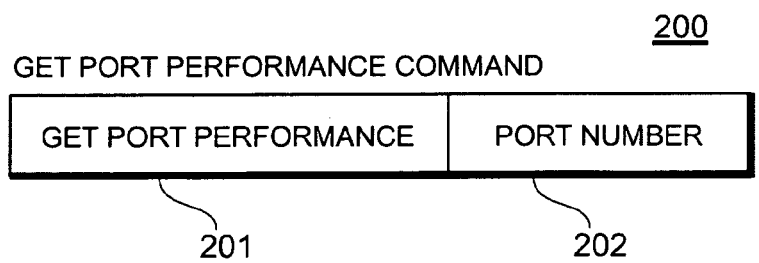
FIGS. 20A and 20B are diagrams explaining the respective formats of a get port performance command and port performance data.

FIG. 20A shows the format of a get port performance command 200. The get port performance command 200 includes a field 201 indicating that the command is a get port performance command, and a field 202 showing identification information for I/O port(s) 15 for which performance is to be obtained.

In step 3002, the dynamic port allocation program 110 obtains the number of I/O ports 15 in the storage system 1 from field 94 of the entry referred to in step 3001, and enters the identification information for each of the obtained number of I/O ports 15 into field 202 of the get port performance command. For example, if the value in field 94 is 4, the identification information for the I/O ports 15 includes a "port 1," "port 2," "port 3," and "port 4."

Then, the dynamic port allocation program 110 sends the get port performance command created in step 3002 to the IP address assigned to the management port 14 in the storage system 1, shown in field 92 of the entry referred to in step 3001 (step 3003).

The dynamic port allocation program 110 then obtains port performance data 210 from the storage system 1, the port performance data 210 being a response to the get port performance command 200 sent to the storage system 1 in step 3003 (step 3004).

Figure 20B:
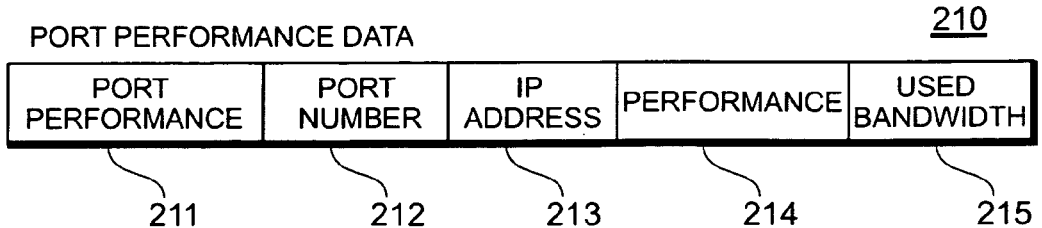

FIG. 20B shows the format of port performance data 210. The port performance data 210 is composed of: a field 211 indicating that the data is port performance data 210; a field 212 for registering identification information (e.g. port number) for an I/O port 15 for which information is stored in the current port performance data 210; a field 213 indicating the IP address assigned to the I/O port 15 indicated in field 212; a field 214 indicating the bandwidth in the I/O port 15 indicated in field 212; and a field 215 indicating the bandwidth used in the I/O port 15 indicated in field 212. Upon receipt of the above-configured data, the dynamic port allocation program 110 obtains the bandwidth used in an I/O port 15 indicated in field 212 and the IP address set for that I/O port 15.

The dynamic port allocation program 110 registers the content of the port performance data 210 obtained from the storage system 1 in the redirect port table 50 (step 3004). More specifically, the value in field 212 is registered in field 51, the value in field 213 is registered in field 54, the value in field 214 is registered in field 52, and the value in field 215 is registered in field 53.

Next, the dynamic port allocation program 110 checks whether the processes in steps 3002-3004 have been executed for all I/O ports 15 in the storage system 1 indicated in the entry in storage management table 90 referred to in step 3001 (step 3005). If the processes in steps 3002-3004 have been completed for all I/O ports 15 (step 3005; YES), the dynamic port allocation program 110 moves to step 3006, and if the processes in steps 3002-3004 have not yet been completed for some I/O ports 15 (step 3005; NO), the dynamic port allocation program 110 executes the processes in steps 3002-3004 for the remaining I/O ports 15.

In step 3006, the dynamic port allocation program 110 refers to field 53 concerning all entries in the redirect port table 50, and calculates the difference between the maximum value and the minimum value of the post-redirect-processing bandwidth. In the example shown in FIG. 5, the maximum value of the post-redirect-processing bandwidth is "800" in the port n, and the minimum value of the post-redirect-processing bandwidth is "400" in the port 1, so the difference is "400."

Then, the dynamic port allocation program 110 checks whether the maximum difference in bandwidth used in each port calculated in step 3006 is larger than the value in field 93 of the storage management table 90 (step 3007), and moves to step 3008 if the calculated difference is larger (step 3007; YES), and moves to step 3009 if it is smaller (step 3007; NO).

In step 3008, the dynamic port allocation program 110 selects a session to be redirected. The details of this processing will be explained later. After selecting a session to be redirected, the dynamic port allocation program 110 recalculates the maximum difference in bandwidth used in each port after that session is redirected (step 3006), and then executes step 3007.

In step 3009, the dynamic port allocation program 110 checks whether there is a session to be redirected or not, by checking whether any entry exists in the redirect session table 60. If there is no session to be redirected (step 3009; NO), the dynamic port allocation program 110 moves to step 3011, and if there is a session to be redirected (step 3009; YES), the dynamic port allocation program 110 executes session redirect processing (step 3010), and then moves to step 3011. The details of the session redirect processing (step 3010) will be explained later.

In step 3011, the dynamic port allocation program 110 checks whether the processes in steps 3001-3010 have been executed for all storage systems 1. If the processes in steps 3001-3010 have been executed for all storage systems 1 (step 3011; YES), the dynamic port allocation program 110 ends the processing, and if the processes in steps 3001-3010 have not been executed for some storage systems 1 (step 3011; NO), the dynamic port allocation program 110 again executes the processes in steps 3001-3010.

Figure 16:
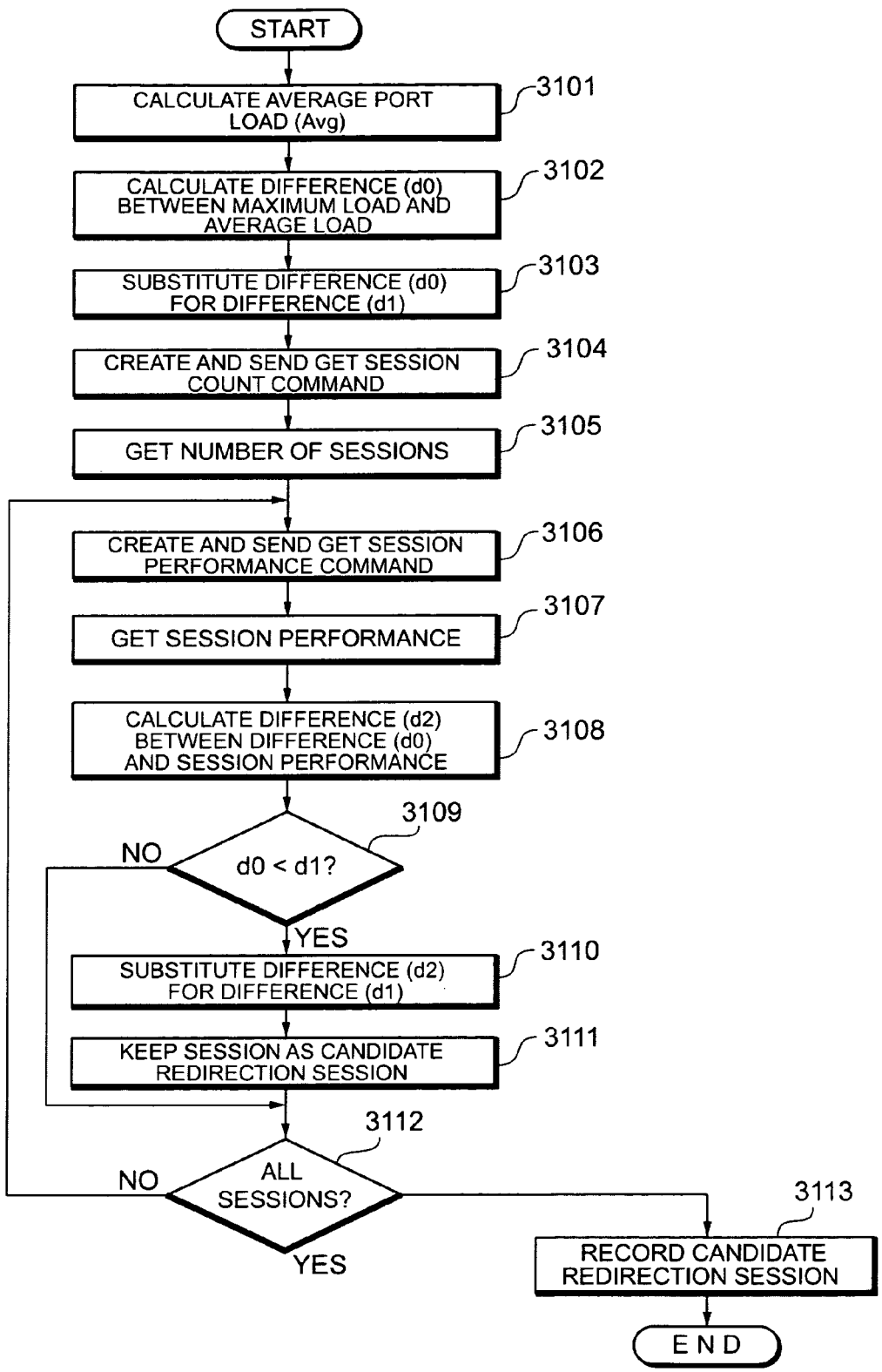
FIG. 16 is a flowchart showing flow of processing in which a dynamic port allocation program specifies a session to be redirected.

FIG. 16 shows flow of processing in which the dynamic port allocation program 110 specifies a session to be redirected (step 3008 in FIG. 15).

The dynamic port allocation program 110 refers to the redirect port table 50, and calculates the average bandwidth (Avg) between the maximum bandwidth and the minimum bandwidth used in the I/O ports 15 (step 3001). For example, in the example shown in FIG. 5, a bandwidth of "800" is used in the port n, and a bandwidth of "400" is used in the port 1, so the average bandwidth (Avg) between these two is "600."

Then, the dynamic port allocation program 110 substitutes the difference between the above average bandwidth (Avg) and the maximum bandwidth used in the I/O port for difference (d0) (step 3102). In the example shown in FIG. 5, the difference between the "800" bandwidth used in the port n and the "600" average bandwidth, i.e., "200" is substituted for the difference (d0).

Next, the dynamic port allocation program 110 substitutes the difference (d0) calculated in step 3102 for difference (d1) (step 3103).

Then, the dynamic port allocation program 110 creates a get session count command 220 for obtaining the number of sessions connected to the I/O port 15 where the maximum bandwidth is used, and sends it to the storage system 1 (step 3104).

Figure 21A:
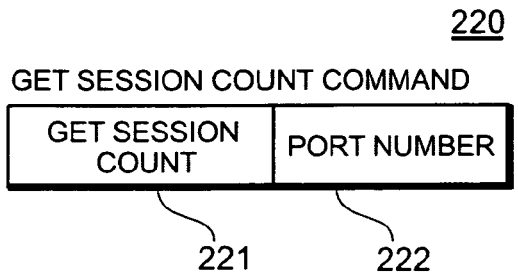
FIGS. 21A-21D are diagrams explaining the respective formats of a get session count command, session count data, a get session performance command, and session performance data.

FIG. 21A shows the format of a get session count command 220. The get session count command 220 includes a field 221 indicating that the command is a get session count command 220, and a field 222 for registering identification information (e.g. port number) for an I/O port 15 for which the number of sessions is to be obtained.

In step 3104, the dynamic port allocation program 110 sets, in field 222, the identification information for the I/O port 15 where the maximum bandwidth is used.

The dynamic port allocation program 110 then obtains session count data 230, which has been sent by the storage system 1 in response to the get session count command 220 (step 3105).

Figure 21B:
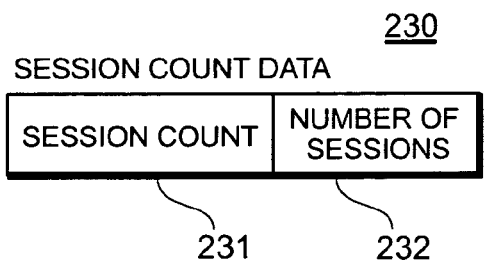

FIG. 21B shows the format of session count data 230. The session count data 230 includes a field 231 indicating that the data is session count data 230, and a field 232 indicating the number of sessions connected to the I/O port 15 specified in field 222 of the get session count command 220.

The dynamic port allocation program 110 repeats the processes in steps 3106-3111 the same number of times as the number of sessions obtained in step 3105.

The dynamic port allocation program 110 creates a get session performance command 240 to obtain the bandwidth used by one session from among all sessions connected to the I/O port 15 where the maximum bandwidth is used, and sends it to the storage system 1 (step 3106).

Figure 21C:
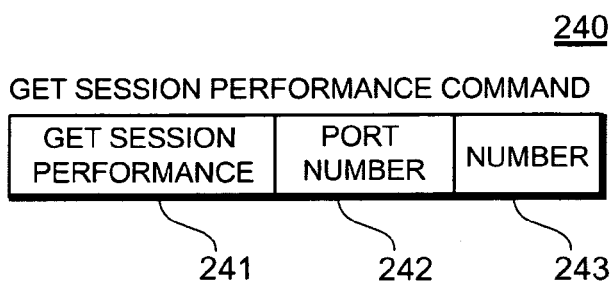

FIG. 21C shows the format of a get session performance command 240. The get session performance command 240 includes: a field 241 indicating that the command is a get session performance command; a field 242 indicating the identification information (e.g. port number) for the I/O port 15 connected to a target session for which used bandwidth is to be obtained; and a field 243 indicating the session number for the target session for which used bandwidth is to be obtained.

The session number entered in field 243 is indicated as integer from "1" to the number of sessions obtained in step 3105. For example, if the number of sessions obtained in step 3105 is "3," the session numbers will be "1," "2," and "3." The dynamic port allocation program 110 sets one of those session numbers in field 243 in step 3106.

Next, the dynamic port allocation program 110 obtains session performance data 250, which has been sent by the storage system 1 in response to the get session performance command 240 (step 3107).

Figure 21D:
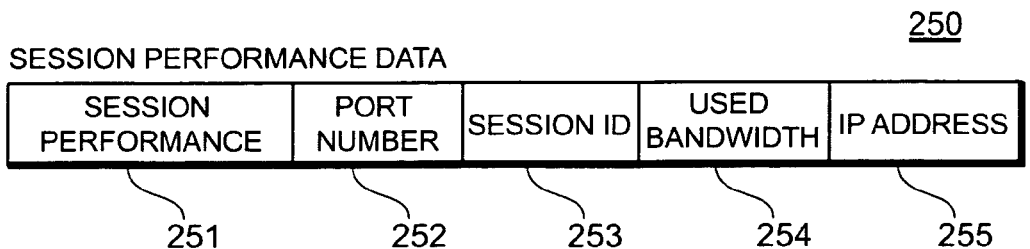

FIG. 21D shows the format of session performance data 250. The session performance data 250 includes: a field 251 indicating that the response data is session performance data

250; a field 252 indicating the identification information (e.g. port number) for the I/O port 15 connected to the session for which information is stored in the current session performance data 250; a field 253 indicating the session ID corresponding to the session number specified in field 243 of the get session performance command 240; a field 254 indicating bandwidth used by the session having the session ID indicated in field 253; and a field 255 indicating the IP address for the I/O port 6 in the host computer via which the host computer is connected to the storage system 1 using the session having the session ID indicated in field 253.

Then, the dynamic port allocation program 110 calculates difference (d2) between the difference (d0) and the value in field 254 of the session performance data 250 obtained in step 3107 (step 3108).

Next, the dynamic port allocation program 110 compares the difference (d1) and the difference (d2) (step 3109), and if the difference (d1) is smaller (step 3109; NO), the dynamic port allocation program 110 moves to step 3112, and if the difference (d2) is smaller (step 3109; YES), the dynamic port allocation program 110 executes steps 3110 and 3111, and then moves to step 3112.

The dynamic port allocation program 110 substitutes the difference (d1) for the difference (d2) (step 3110), and then keeps the session performance data 250 obtained in step 3107 as information about a candidate redirection session (step 3111).

In step 3112, the dynamic port allocation program 110 checks whether the processes in steps 3106-3111 have been executed the same number of times as the number of sessions obtained in step 3105 (step 3112). If the processes in steps 3106-3111 have been executed for all sessions (step 3112; YES), the dynamic port allocation program 110 moves to step 3113, and if the processes in steps 3106-3111 have not been executed for some sessions (step 3112; NO), the dynamic port allocation program 110 executes the process in step 3106 for the remaining sessions.

In step 3113, the dynamic port allocation program 110 records the content of the session performance data 250, which has been selected in step 3111 as information for a candidate redirection session, in the redirect session table 60. More specifically, the information in field 252 is registered in field 65, the information in field 253 is registered in field 62, the information in field 255 is registered in field 63, and the information in field 254 is registered in field 64. Also, the identification information for the I/O port 15 where the minimum bandwidth is used is recorded in field 61.

As a result of the above-described processes, the processing for selecting a session to be redirected ends.

Figure 17:
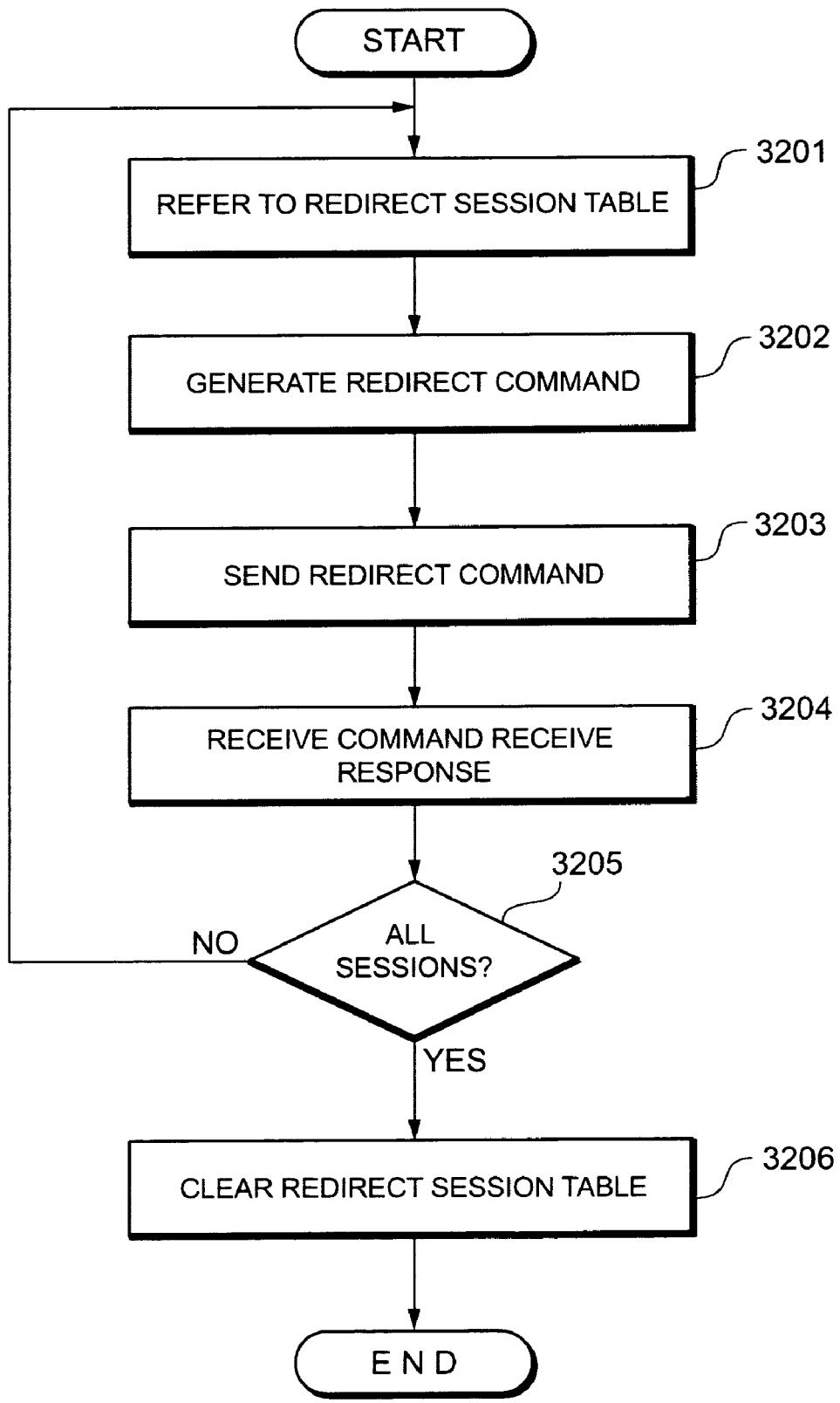
FIG. 17 is a flowchart showing flow of processing in which a dynamic port allocation program sends a host computer a command for redirection.

FIG. 17 shows flow of processing in which the dynamic port allocation program 100 sends the host computer 2 a command for redirection (step 3010 in FIG. 15). The dynamic port allocation program 110 obtains one entry in the redirect session table 60 (step 3201), and creates a redirect command 260 to send it to the host computer 2 (step 3202).

Figure 22A:
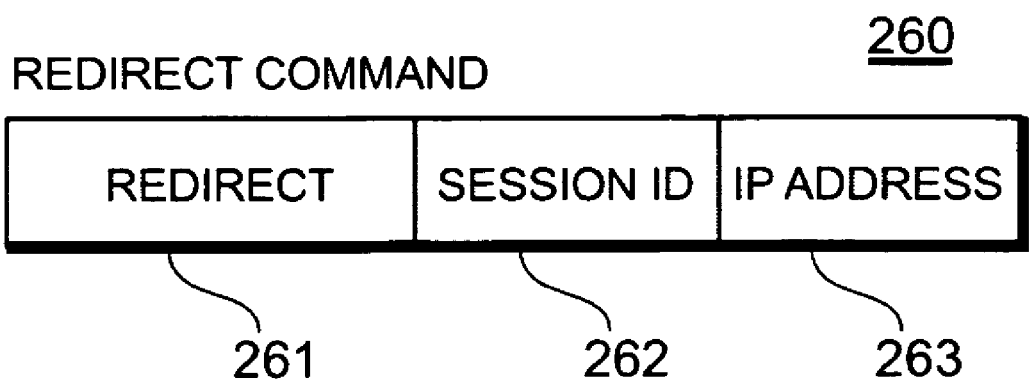
FIGS. 22A and 22B are diagrams explaining the respective formats of a redirect command and a redirect command receive response.

FIG. 22A shows the format of a redirect command 260. The redirect command 260 includes: a field 261 indicating that the command is a redirect command 260; a field 262 for registering the session ID for a session to be redirected; and a field 263 indicating the IP address for an I/O port 15 to which the session is to be redirected.

In step 3202, the dynamic port allocation program 110 sets the value in field 62 of the redirect session table 60 in field 262, and also sets, in field 263, the value in field 54 of an entry in the redirect port table 50, whose field 51 stores the I/O port 15 identification information that corresponds to the identification information shown in field 61 of the redirect session table 60.

Next, the dynamic port allocation program 110 sends the redirect command 260 created in step 3202 to the IP address registered in field 63 of the entry in the redirect session table 60, which has been referred to when creating the redirect command, i.e., the IP address for the I/O port 6 in the host computer 2 whose session is to be redirected (step 3203).

Then, the dynamic port allocation program 110 receives a redirect command receive response 270, which is data sent in response to the redirect command 260 sent in step 3203 (step 3204).

Figure 22B:
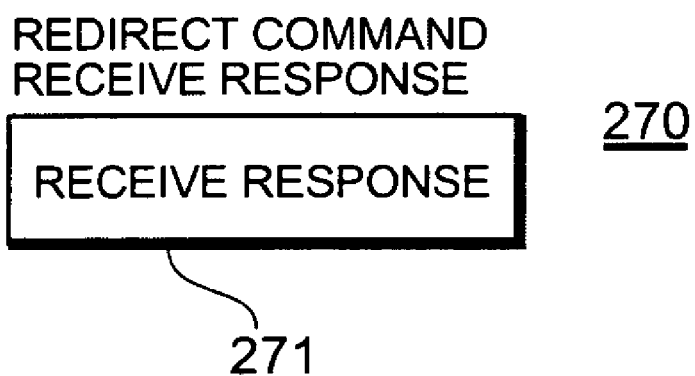

FIG. 22B shows the format of a redirect command receive response 270. The redirect command receive response 270 includes a field 271 indicating that a redirect command 260 has been received.

Then, the dynamic port allocation program 110 checks whether the processes in steps 3201-3204 have been executed for all entries in the redirect session table 60 (step 3205). If the processes in steps 3201-3204 have been executed for all entries (step 3205; YES), the dynamic port allocation program 110 deletes all entries in the redirect session table 60 (step 3206), and ends the processing. On the other hand, if the processes in steps 3201-3204 have not been executed for some entries (step 3205; NO), the dynamic port allocation program 110 executes steps 3201-3204 for the remaining entries.

Figure 18:
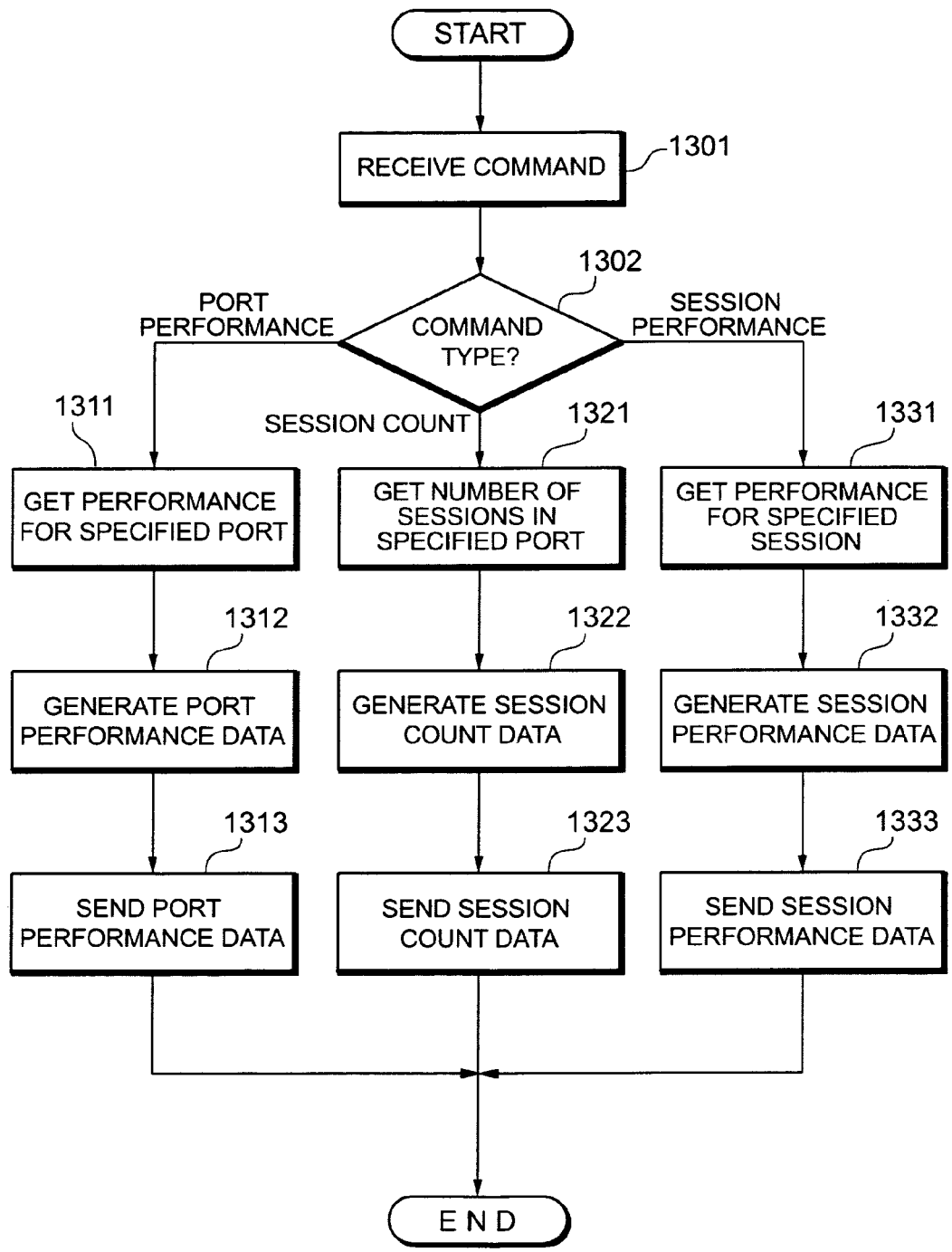
FIG. 18 is a flowchart showing flow of processing executed when a controller in a storage system receives various commands from a dynamic port allocation program.

FIG. 18 shows flow of processing executed when the controller 16 in the storage system 1 receives various commands from the dynamic port allocation program 110.

The controller 16 receives a command from the management computer 100 (step 1301).

The controller 16 checks the type of the received command (step 1302). If the received command is a get port performance command 200, as a result of the command type checking, the controller 16 moves to step 1311. If the received command is a get session count command 220, the controller 16 moves to step 1321. If the received command is a get session performance command 240, the controller 16 moves to step 1331.

In step 1311, the controller 16 obtains an entry in the port performance information table 30 concerning the I/O port 15 having information corresponding to the identification information recorded in field 202 of the get port performance command 200. More specifically, the controller 16 obtains an entry whose value in field 31 corresponds to the identification information recorded in field 202.

The controller 16 then generates port performance data 210 based on the content of the entry in the port performance information table 30 obtained in step 1311 (step 1312). More specifically, the value in field 31 is set in field 212, the value in field 34 is set in field 213, the value in field 32 is set in field 214, and the value in field 33 is set in field 215.

Then, the controller 16 sends the port performance data 210 generated in step 1312 to the management computer 100 that sent the command received in step 1301 (step 1313), and then ends the processing.

In step 1321, the controller 16 obtains, from the session performance information table 40, the number of sessions connected to the I/O port 15 having information corresponding to the identification information recorded in field 222 of the get session count command 220. More specifically, the controller 16 obtains the number of entries 41 in the session performance information table 40 whose values in fields 41 correspond to the value in field 222 of the get session count command 220.

Then, the controller 16 generates session count data 230 to inform the management computer 100 of the number of sessions obtained in step 1321 (step 1322). More specifically, the number of sessions obtained in step 1321 is set in field 232 of the session count data 230.

Then, the controller 16 sends the session count data 230 generated in step 1322 to the management computer 100 that sent the command received in step 1301 (step 1323), and ends the processing.

In step 1331, the controller 16 obtains an entry from the session performance information table 40 concerning a session connected to the I/O port 15 having information corresponding to the identification information recorded in field 242 of the get session performance command 240, and having a session number corresponding to the number recorded in field 243. More specifically, the controller 16 obtains, from among the entries in the session performance information table 40 whose values in fields 41 correspond to the value in field 242 of the get session performance command 240, an entry having the same number as that in field 243. For example, if the value in field 243 is "2," the second entry is obtained.

Then, the controller 16 generates session performance data 250 based on the content of the entry in the session performance information table 40 obtained in step 1331 (step 1332). More specifically, the values in fields 41, 42, 44, and 43 of the session performance information table 40 are set in fields 252, 253, 254, and 255 of the session performance data 250, respectively.

The controller 16 then sends the session performance data 250 generated in step 1332 to the management computer 100 that sent the command received in step 1301 (step 1333), and ends the processing.

Figure 19:
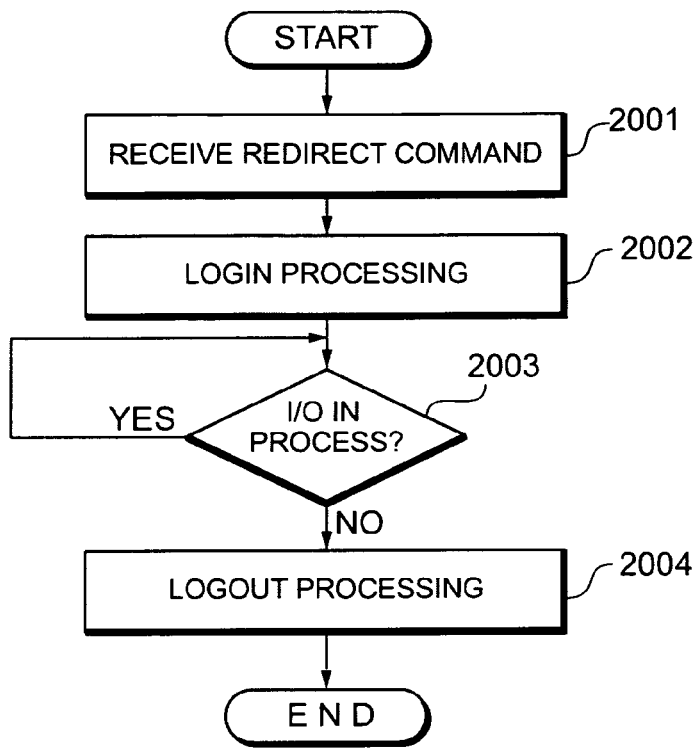
FIG. 19 is a flowchart showing flow of processing executed when an agent program in a host computer receives a redirect command from a dynamic port allocation program.

FIG. 19 shows flow of processing executed when the agent program 500 in the host computer 2 receives a redirect command from the dynamic port allocation program 110.

The agent program 500 receives a redirect command 260 from the management computer 100 (step 2001), and sends back to the management computer 100 a redirect command receive response 270 that indicates the command has been received.

The agent program 500 logs-in to the IP address set in field 263 of the redirect command 260 received in step 2001 (step 2002), and establishes a session.

Then, the agent program 500 checks whether access processing to the storage system 1 is being executed using the session having the session ID set in field 262 of the redirect command 260 received in step 2001 (step 2003). If access processing is being executed (step 2003; YES), the agent program returns to step 2003. If no access processing is being executed (step 203; NO), the agent program 500 disconnects the session having the session ID set in field 262 (step 2004), and ends the processing.

Note that the login processing and session disconnection processing are based on the specifications set forth in the "RFC-3347 Small Computer Systems Interface protocol over the Internet (iSCSI) Requirements and Design Considerations," IETF 2002.

As described above, according to embodiment 2 of the present invention, the management computer 100 monitors how much bandwidth is used in each I/O port 15 in the storage system 1, and redirects a host computer 2 connected to a port where a larger bandwidth is used to a port where a smaller bandwidth is used. As a result, an advantageous effect is achieved in that the bandwidth used in each of a plurality of I/O ports 15 in the storage system 1 can be well balanced.

Also, if one host computer 2 uses a considerably large amount of the bandwidth in an I/O port, it is possible to prevent considerable deterioration of performance in other host computers 2 connected to the same I/O port 15 when they access a volume 19 provided by the storage system 1.

Also, since an I/O port 15 in the storage system 1 to which the host computers 2 are connected is automatically selected in accordance with the load in each port, and there is no need for design and settings for allocating Ian I/O port in the storage system 1, to which the host computers 2 are connected, another advantageous effect is also achieved in that the administrator's workload can be reduced.

While the invention has been described with respect to a limited number of embodiments, those skilled in the art, having benefit of this disclosure, will appreciate that other embodiments can be devised that do not depart from the scope of the invention as disclosed herein. Accordingly, the scope of the invention should be limited only by the attached claims.

What is claimed is:

1. A computer system having a plurality of host computers and at least one storage system that has a plurality of ports for connection to the plurality of host computers and provides volumes for the plurality of host computers via a storage network, wherein a host computer and a storage system are connected to each other through a single port, the storage system comprising:

a port load monitoring unit for monitoring the difference in load between the plurality of ports;

a path load monitoring unit for monitoring the load applied to a connection path between the plurality of host computers and the storage system;

an identification unit for identifying, when the difference in load between the plurality of ports reaches or exceeds a predetermined value, the host computers connected to the port with the highest load in the plurality of ports;

a connection control unit for disconnecting at least one of the identified host computers from the storage system; and a transmission unit for transmitting, when the host computer that has been disconnected from the storage system sends a reconnection request, a command for redirection to the port with the lowest load in the plurality of ports, to the host computer that has sent the reconnection request, wherein the identification unit calculates the average load between the port with the highest load and the port with the lowest load in the plurality of ports, calculates the load difference between the average load and the load in the port with the highest load or the port with the lowest load, and selects, from among the plurality of host computers, the host computer that applies the load closest to that load difference to the port, and wherein the storage system calculates the difference in load between the plurality of ports when the identified host computer has been redirected to the port with the lowest load, and if the difference in load between the plurality of ports when the identified host computer has been redirected to the port with the lowest load reaches or exceeds a predetermined value, the storage system executes the processing for identifying the host computers connected to the port with the highest load.

2. A computer system having a plurality of host computers, at least one storage system that has a plurality of ports for connection to the plurality of host computers and provides volumes for the plurality of host computers via a storage network, wherein a host computer and a storage system are connected to each other through a single port, and a management computer connected respectively to the plurality of host computers and the storage system via a management network, the management computer comprising:

a port load monitoring unit for monitoring the difference in load between the plurality of ports;

a host load monitoring unit for monitoring the load applied to the plurality of ports by the host computers connected thereto;

an identification unit for identifying, when the difference in load between the plurality of ports reaches or exceeds a predetermined value, the host computers connected to the port with the highest load in the plurality of ports; and a transmission unit for transmitting a command for reconnection to the port with the lowest load in the plurality of ports, to at least one of the identified host computers, wherein the host computer establishes connection to the port specified in the reconnection command from the management computer, wherein the identification unit calculates the average load between the port with the highest load and the port with the lowest load in the plurality of ports, calculates the load difference between the average load and the load in the port with the highest load or the port with the lowest load, and selects, from among the plurality of host computers, the host computer that applies the load closest to that load difference to the port, and wherein the management computer calculates the difference in load between the plurality of ports when the identified host computer has been redirected to the port with the lowest load, and if the load difference between the plurality of ports when the identified host computer has been redirected to the port with the lowest load reaches or exceeds a predetermined value, the management computer again executes the step of identifying the host computers connected to the highest load.

3. The computer system according to claim 2, wherein, after the host computer has established connection to the port in the storage system specified in the reconnection command sent from the management computer, the host computer disconnects connection between the host computer and the port that the host computer had used up to then, when access to that previously-used port is completed.

4. A dynamic port allocation method in a computer system having a plurality of host computers and at least one storage system that has a plurality of ports for connection to the plurality of host computers and provides volumes for the plurality of host computers via a storage network, wherein a host computer and a storage system are connected to each other through a single port, the dynamic port allocation method comprising:

the storage system monitoring a difference in load between the plurality of ports;

the storage system monitoring a load applied to a connection path between the plurality of host computers and the storage system;

the storage system identifying, when the difference in load between the plurality of ports reaches or exceeds a predetermined value, the host computers connected to the port with the highest load in the plurality of ports;

the storage system disconnecting at least one of the identified host computers from the storage system; and the storage system transmitting, when the host computer that has been disconnected from the storage system sends a reconnection request, a command for redirection to the port with the lowest load in the plurality of ports, to the host computer that has sent the reconnection request, wherein the step of identifying the host computers includes:

calculating an average load between the port with the highest load and the port with the lowest load in the plurality of ports;

calculating a load difference between the average load and the load in the port with the highest load or the port with the lowest load; and selecting, from among the plurality of host computers, the host computer that applies the load closest to that load difference to the port, and wherein the storage system is operative for:

calculating the difference in load between the plurality of ports when the identified host computer has been redirected to the port with the lowest load; and executing the step of identifying the host computers, if the difference in load between the plurality of ports when the identified host computer has been redirected to the port with lowest load reaches or exceeds a predetermined value.

5. A dynamic port allocation method in a computer system having a plurality of host computers, at least one storage system that has a plurality of ports for connection to the plurality of host computers and provides volumes for the plurality of host computers via a storage network, wherein a host computer and a storage system are connected to each other through a single port, and a management computer connected respectively to the plurality of host computers and the storage system via a management network, the dynamic port allocation method comprising:

the management computer monitoring a difference in load between the plurality of ports;

the management computer monitoring a load applied to the plurality of ports by the host computers connected thereto;

the management computer identifying, when the difference in load between the plurality of ports reaches or exceeds a predetermined value, the host computers connected to the port with the highest load in the plurality of ports;

the management computer transmitting a command for reconnection to the port with the lowest load in the plurality of ports, to at least one of the identified host computers; and the host computer establishing connection to the port specified in the reconnection command from the management computer, calculating the difference in load between the plurality of ports when the identified host computer has been redirected to the port with the lowest load; and further comprising executing the step of identifying the host computers, if the difference in load between the plurality of ports when the identified host computer has been redirected to the Dort with the lowest load reaches or exceeds a predetermined value.

6. The dynamic port allocation method according to claim 5, wherein the step of the host computer establishing connection includes: disconnecting, after the host computer has established connection to the port in the storage system specified in the reconnection command sent from the management computer, connection between the host computer and the port that the host computer previously had used up to then, when access to that previously-used port is completed.

* * * * *